United States Patent [19]
Deshaies

[11] Patent Number: 5,944,516
[45] Date of Patent: Aug. 31, 1999

[54] ANIMAL TOOTH CLEANING DEVICE AND METHOD

[76] Inventor: Brian Deshaies, 35 Smith Corner Rd., Newton, N.H. 03858

[21] Appl. No.: 09/086,924

[22] Filed: May 29, 1998

Related U.S. Application Data

[60] Provisional application No. 60/047,975, May 29, 1997.

[51] Int. Cl.$^6$ .................................................. A61D 5/00
[52] U.S. Cl. .............................................. 433/1; 15/167.1
[58] Field of Search ................................ 433/1; 15/167.1

[56] References Cited

U.S. PATENT DOCUMENTS

| | | | |
|---|---|---|---|
| D. 362,118 | 9/1995 | Nelson | D30/158 |
| 738,455 | 9/1903 | King | 401/273 |
| 893,635 | 7/1908 | Marquart | 401/273 |
| 1,684,636 | 12/1928 | Baker | 15/167.1 |
| 2,819,482 | 1/1958 | Applegate | 15/167.1 |
| 3,223,289 | 12/1965 | Bouet | 401/157 |
| 3,256,893 | 6/1966 | McEachran | 401/190 |
| 3,383,157 | 5/1968 | Goldhirsh | 401/190 |
| 3,612,706 | 10/1971 | Verga | 401/190 |
| 3,853,412 | 12/1974 | Griffin | 15/167.1 |
| 4,869,277 | 9/1989 | Olsen | 433/166 |
| 5,126,137 | 6/1992 | Lambert | 424/401 |
| 5,382,106 | 1/1995 | Voigt | 401/157 |
| 5,392,482 | 2/1995 | Drulias et al. | 15/167.1 |
| 5,407,287 | 4/1995 | Braun et al. | 401/190 |
| 5,511,273 | 4/1996 | Carroll | 433/1 |

OTHER PUBLICATIONS

Vicki Croke, "My, What Bright Teeth You Have", *The Boston Globe*, undated.
"More Pampered Pets", undated.
Cheryl S. Smith, "Checking up on Your Dog's Teeth Can Do More Than Improve its Smile", *AKC Gazette* vol. 114 No. 2, pp. 58–60 (Feb. 1997).
David Falcone, Time to Combat . . . Dog Breath!!, undated.
Gary Wilkes, "Dental Care Counts in Animals' Overall Health", *The Sun*, Undated.
"Chiropractors and Dentists for Dogs", *Gazette* (Dec. 1996).

*Primary Examiner*—John J. Wilson
*Attorney, Agent, or Firm*—Wolf, Greenfield & Sacks, P.C.

[57] ABSTRACT

A device for cleaning the teeth of a dog or other animal has a core element having a plurality of brushes extending therefrom and a compressible hollow outer shell having a plurality of holes, each of which is aligned with a respective one of the plurality of brushes, so that the brushes are exposed. When the animal bites against the shell, the shell is compressed, in turn causing the brushes to further protrude from the shell and exert a cleaning effect on the animal's teeth.

18 Claims, 5 Drawing Sheets

ANIMAL TOOTH CLEANING DEVICE AND METHOD

RELATED APPLICATION

This non-provisional application claims the benefit under 35 U.S.C. §119(e) of co-pending U.S. provisional application Ser. No. 60/047,975, filed May 29, 1997, entitled "Animal Tooth Cleaning Device and Method" by Brian Deshaies, incorporated herein by reference.

BACKGROUND OF THE INVENTION

1. Field of the Invention

The present invention relates to an animal tooth cleaning device that is adapted to be gripped in the mouth of an animal, e.g., a dog, such that the animal's teeth are automatically cleaned while the animal's teeth are in rubbing contact with the device.

2. Discussion of the Related Art

Maintaining good dental hygiene is just as important for pet animals, such as dogs and cats, as it is for their human owners. Dogs and cats do not get cavities the way humans do. Periodontal, or gum disease, however, is a common problem for dogs and cats due to the buildup of tartar or calculus on the teeth. As many as 80% of dogs and cats over three years of age may suffer from some form of it. Infected gums can easily transmit bacteria to the blood stream, causing serious illness.

Pet owners should be aware of the serious problems created when their pet's teeth are neglected. Gum disease or an infected tooth can affect the overall health of the animal and also reduce the animal's life expectancy. Additionally, a dental infection can lead to liver, heart, and kidney damage.

Many animals put up with dental pain in silence. It is possible that an animal with an infected tooth might exhibit only a slight discoloration in the mouth. Some pets may stop drinking cold water or eating harder foods. It is possible that an animal's reaction to a dental problem can be so subtle that the mouth disease may go unnoticed until it becomes a serious problem.

The field of animal dentistry is relatively new. More veterinarians are becoming skilled in dental procedures. As an alternative to pulling teeth, root canals, orthodontics and tooth reconstruction are being performed. As with humans, however, maintaining dental health requires regular maintenance, i.e., a daily routine of brushing.

Most pet owners would understand the difficulties involved in having to brush their pet's teeth everyday. Many animals just won't tolerate the experience. If this daily brushing is attempted, but is unsuccessful, an owner may be tempted to discontinue the practice, thereby endangering their pet's health.

There are known devices on the market which hold themselves out as helping to maintain the dental health of a dog or a cat. These items include Milk-Bone® dog biscuits, rope chews, as well as chew toys made from cow's hooves.

The plaque that builds up on an animal's teeth, causing gum disease, must be removed from at, or under, the gum-line. The aforementioned items, however, do not remove plaque below the gum-line. The knotted nylon "bones" and rawhide, while providing good chewing surfaces and removing plaque from the surface of teeth, do not go below the gum-line and may cause intestinal obstructions if swallowed. Cow hooves, although a popular chew treat, can become wedged between the dog's teeth, leading to serious dental problems. As an alternative, hard rubber and softer nylon-type chew toys are proposed but, once again, these do not clean below the gum-line.

Another disadvantage of rope bones for cleaning teeth is that dogs just tend to tear them with their front teeth instead of really chewing. This fails to clean the back molars. There is also a risk that the dog will tear apart the rope bone and thus choke on large pieces of rope.

U.S. Pat. No. 5,126,137, issued to W. S. Lambert on Jun. 30, 1992, (hereinafter "Lambert '137) shows a device adapted to be gripped by an animal's tooth to exert a tooth cleaning action. The device comprises an open-celled foam body encased in a sheath, or covering, formed of an open weave gauze material. The gauze material is preferably a tough, high strength material, such as dacron, nylon or Kevlar™, in thread form, whereby the animal's teeth are not likely to break the gauze threads when the animal exerts a biting action on the device. The device preferably has a dog bone shape or a hot dog shape.

The foam body of Lambert'137 is impregnated with various food substances or materials in order to attract the animal (dog or cat) to the device. Lambert mentions water-soluble beef flavoring, catnip and mild dental abrasives, as materials that can be impregnated into the foam body.

When the device is attacked by the dog, or other animal, the animal's teeth penetrate the gauze sheath material so that the gauze threads have a rubbing action on the side surfaces of the teeth. This rubbing action produces a tooth cleaning effect. It, however, does not clean below the gum.

One potential problem with the device of Lambert is that the animal's teeth can potentially become stuck in the threads of the gauze covering, such that the animal is prevented from letting go of the device; the device could conceivably stick to the animal's mouth even against the efforts to let go of the device. If the pore openings in the gauze are sufficiently small that the gauze threads rub on the animal's teeth, then presumably (in some cases) the threads can grip the side surfaces of the teeth so that the threads become stuck in the tooth spaces.

Another problem with Lambert's '137 device is that only limited quantities of attractant materials (catnip, toothpaste, etc.) can be impregnated into the foam body. After a comparatively few biting actions by the animal essentially all of the attractant material will be extruded out of the foam body. It is believed that the device of Lambert '137 would have a relatively short service life, i.e., a relatively few bite cycles, before depletion of the attractant material to an ineffective level.

Another problem with the device of Lambert '137 is that the fluid impregnated into the sponge is likely to squirt out of the sponge at undesired locations. Movement of the animal tooth into the sponge at one point is likely to depress other areas of the sponge, thereby causing uncontrolled squirting of the fluid in various different directions.

Thus, what is needed is an apparatus that will remove plaque from an animal's teeth, not only at the surface of the teeth, but also below the gum-line so as to reduce the occurrence of gum disease. Such a device should be one that the animal can implement itself through a normal action such as, for example, chewing.

SUMMARY OF THE INVENTION

The animal tooth cleaning device of the present invention comprises a core element having at least one brush extending radially therefrom and a compressible hollow outer shell disposed around the core element. The outer shell includes at least one opening and the at least one opening is aligned with a respective one of the at least one brushes.

In one embodiment, the compressible hollow shell is more compressible than the core element, so that when an animal bites the hollow shell, the hollow shell is compressed, in turn causing the at least one brush to protrude from the hollow shell, through the respective opening, and exert a cleaning effect on the animal's teeth.

In another embodiment, a method of manufacturing a device for cleaning an animal's teeth, the method comprises providing at least one brush extending from a core element; and disposing a compressible hollow shell around the core element, the shell having at least one opening aligned with the at least one brush.

In an additional embodiment, a method of cleaning the teeth of an animal, the method comprises providing at least one brush on a surface of a core element so that the at least one brush extends radially therefrom; disposing a hollow outer shell about the core element, the hollow outer shell comprising at least one opening aligned with a respective at least one brush; and causing the animal to bite on the hollow outer shell, thereby causing the shell to deform and expose the at least one brush, through the respective opening, wherein the at least one brush contacts at least one tooth of the animal.

BRIEF DESCRIPTION OF THE DRAWINGS

These and many other advantages of the present invention will be readily appreciated as the same becomes better understood by reference to the accompanying drawings, in which like reference numerals designate like or corresponding parts throughout, wherein:

FIG. 1 is a sectional view, taken through a tooth cleaning device embodying the present invention;

FIG. 2 is a sectional view, taken through a check valve used in the FIG. 1 embodiment;

FIG. 3 is a fragmentary enlarged sectional view, taken through a bristle unit used in the FIG. 1 device, FIG. 3 shows the detailed construction of a metering valve that can be used in the bristle unit to distribute toothpaste onto the bristles;

FIG. 4 is a fragmentary sectional view, taken on line 4—4 in FIG. 3;

FIG. 5 shows an arrangement that is similar to the FIG. 1 device, except as regards the mechanism for pressurizing the toothpaste supply;

FIG. 6 is an elevational view of another embodiment of the invention;

DETAILED DESCRIPTION

Figures 1, 2, 3, 4, 5, 6:
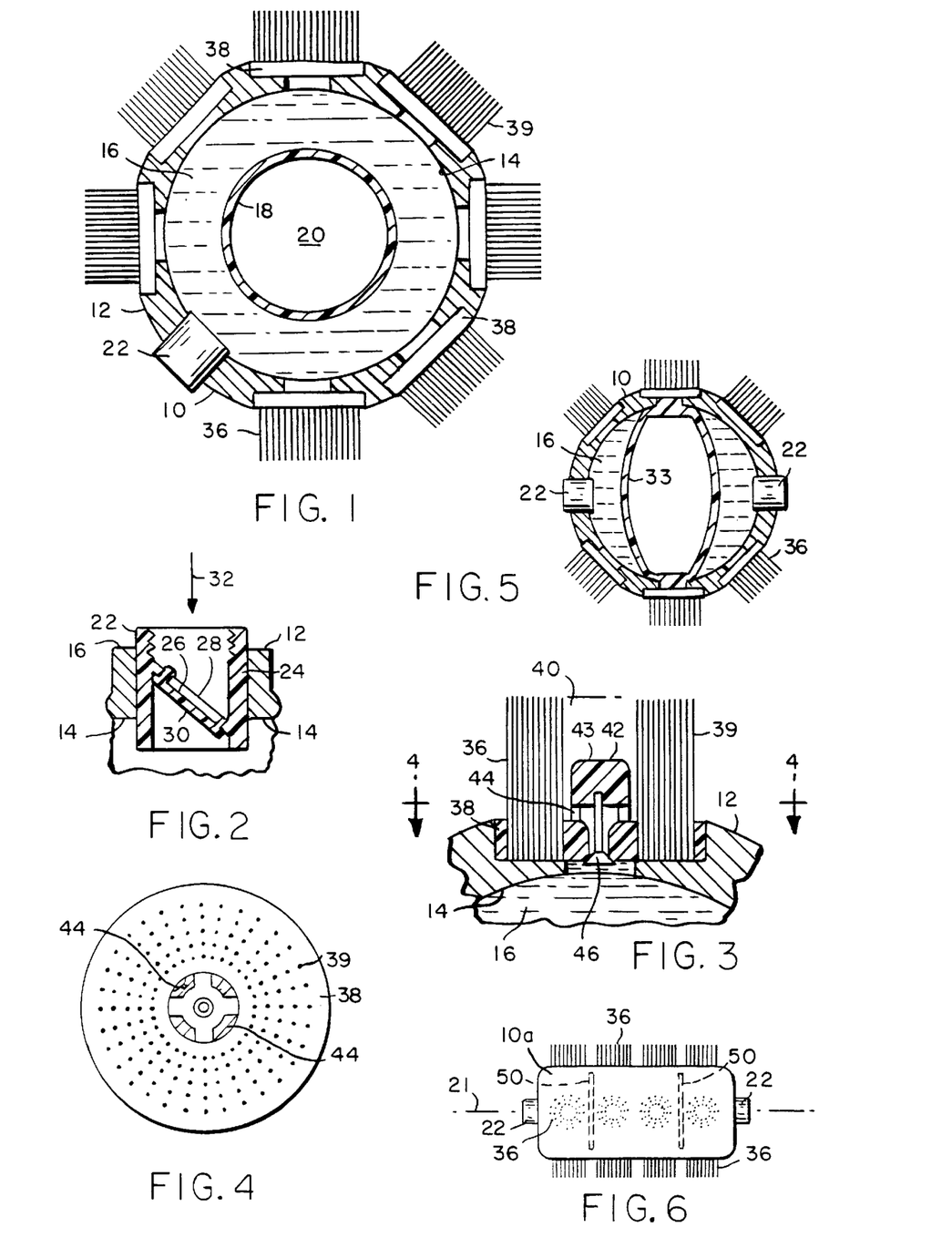

FIG. 1 is a sectional view, taken through a tooth cleaning device embodying the present invention.

FIG. 1 of the drawings shows a relatively rigid, or compressible, hollow shell 10, having an exterior spherical surface 12 and interior spherical surface 14. Spherical surface 14 forms an internal closed chamber adapted to contain pressurized fluid toothpaste, preferably in gel form. In the drawing the toothpaste is designated by numeral 16. Shell 10 is preferably formed of a relatively rigid material that is, at the same time, somewhat compressible, and not so hard as to be potentially injurious to an animal's tooth when the animal's tooth forcibly contacts the shell exterior surface 12. Shell 10 can, for example, be formed of a rigid plastic material or a hard rubber, having a relatively high durometer, whereby the shell is resistant to pressures generated by the pressurized toothpaste 16.

Toothpaste 16 may be pressurized by means of an internal balloon 18 containing a pressurized gas 20. Balloon 18 is preferably formed of an elastomeric material, and pressurized with a gas, prior to placement of the balloon 18 into shell 10.

With the pressurized balloon pre-positioned within shell 10, toothpaste 16 can be injected into the shell 10 through a check valve 22. As shown in FIG. 2, the check valve 22 comprises a tubular housing 24 having a partition 26. An opening 28 in the partition 26 is normally closed by a flap-type valve element 30 that can deflect when the toothpaste flows in the arrow 32 direction into the shell 10.

A toothpaste tube, or other toothpaste source, can be threadably joined to valve housing 24; thereafter the toothpaste can be pumped in the arrow 32 direction through valve opening 28 into the interior chamber within shell 10. As the toothpaste fills the chamber, the pressurized balloon 18 is reduced in size. The balloon provides a pressure source that maintains the toothpaste in a pressurized condition. Check valve 22 prevents the pressurized toothpaste from escaping out of the chamber formed by shell 10. Balloon 18 preferably is sufficiently pressurized as to maintain the toothpaste in a pressurized state until all of the paste has been dispensed from shell 10, i.e., until balloon 18 completely fills the chamber.

FIG. 5 shows an arrangement that is basically the same as the FIG. 1 device, except as regards the mechanism for pressurizing the toothpaste supply.

FIG. 5 is a sectional view, taken in the same direction as FIG. 1 but on a reduced scale, and showing an additional form that the invention can take.

FIG. 1 shows the balloon as a spherical elastomeric balloon floatably disposed within the toothpaste, so that the balloon is entirely surrounded by the paste (or gel). In the arrangement of FIG. 5, the pressurizing mechanism comprises a football-shaped balloon 33 having its closed ends affixed to the outer shell 10. The bristle assemblies at the North and South poles of the shell are closed or inactive as regards the dispensing of toothpaste. The balloon 33 is charged with a pressurizing gas to maintain the surrounding toothpaste (gel) 16 in a pressurized condition.

The external surface 12 of shell 10 has pockets therealong for mounting bristle units 36 at preselected points along the shell surface. FIG. 1 shows seven bristle units 36 spaced around the shell circumference. Considering the shell in a three-dimensional sense, in a preferred, but non-limiting, embodiment there will be twenty-three (23) bristle units space essentially equidistantly around the shell circumference.

Each bristle unit 36 comprises a mounting plug, or disc, 38, seated within a pocket on the exterior shell surface 12, and a large multiplicity of bristles 39 projecting from the plug 38 away from the shell surface. The bristles 39 may be similar to the bristles used on conventional toothbrushes. In a preferred embodiment, each bristle has a projection length (from disc 38) measuring about one-half inch.

FIG. 3 is a fragmentary enlarged sectional view, taken through a bristle unit used in the FIG. 1 device. FIG. 3 shows the detailed construction of a metering valve that can be used in the bristle unit to distribute toothpaste onto the bristles.

FIG. 4 is a fragmentary sectional view, taken on line 4—4 in FIG. 3.

At least some of the bristle units can be constructed as shown in FIGS. 3 and 4. As there shown, the bristles are arranged in a ring pattern to form a central space 40 devoid of bristles. A metering valve 42 is located within the central space 40 defined by the ring of bristles.

Metering valve 42 can be constructed in various ways. However, as shown in FIGS. 3 and 4, the metering valve comprises a deflectable button structure that includes a head 43 joined to disc 38 by four collapsible legs 44. Preferably the button structure and disc 38 are integrally formed out of an elastomer. Legs 44 are collapsible and deflectable in response to external forces applied against head 43 by an animal's tooth during a biting action on the device. FIG. 3 includes two arrows indicating two directions that an animal's tooth might take as the animal attempts to bite the device.

A small poppet valve element 46 has a stem connected to deflectable head 43 so that when the head 43 is deflected by contact with an animal's tooth, the poppet valve element 46 is unseated from the associated valve seat in the inner face of the bristle-mounting disc 38.

As valve element 46 becomes unseated, pressurized fluid gel 16 flows through the valve and the spaces between legs 44. The gel is thus supplied to the associated bristles for tooth cleaning action as the animal's tooth rubs on the bristles. Assuming the toothpaste has a pleasant taste to the animal, then the animal will repeat the biting process without specific encouragement on the part of the pet owner.

It will be understood that valve element 46 is in an open condition only so long as the animal's tooth deflects head 43 from its normal position (as shown in FIG. 3). When the animal's tooth is not in contact with head 43 the resilient legs 44 will return head 43 and valve element 46 to the FIG. 3 closed position. As noted previously, the metering valve can be constructed in various ways; the essential requirement is that the metering valve be activated to the open position by forcible contact of the valve head with the animal's tooth.

The device of the present invention, comprises a relatively rigid, or compressible, shell containing a pressurized supply of toothpaste, and one or more metering valves for dispensing toothpaste from the shell onto bristles on the shell outer surface. The metering valves are preferably actuated by contact with the animal's tooth, such that the toothpaste is dispensed as required to achieve a tooth cleaning action.

It is not necessary that all of the bristle units be equipped with metering valves. Some of the bristle units can have bristles without the central vacant space 40 or metering valve 42. Such bristle units could have bristles extending along the entire surface of the mounting disc 38.

The number of bristle units 36 is dependent to a certain extent on the size and shape of shell 10. As previously noted, the spherical shell depicted in FIG. 1 has twenty-three bristle units. Shells having other shapes can have different numbers of bristle units.

FIG. 6 is an elevational view, of another embodiment of the present invention.

FIG. 6 shows an arrangement wherein the rigid shell 10a has a cylindrical shape; shell surfaces concentric with axis 21 are circular (or cylindrical). The shell 10a has two transverse elastomeric diaphragms 50 spaced axially inwardly from the ends of the shell. Toothpaste is charged into the end spaces defined by the diaphragms, through valves 22. The central space defined between the two diaphragms 50, 50, is pressurized with a compressed gas, e.g., air.

In the exemplary, but non-limiting arrangement shown in FIG. 6, there are four rows of bristle assemblies 36 extending around the shell circumference. The bristle assemblies 36 in the two end rows (left and right in FIG. 6) may be equipped with toothpaste dispensing valves of the types shown in FIG. 3 or FIG. 7. The bristle assemblies in the two intermediate rows of bristle assemblies are closed, i.e., without toothpaste dispensing valves.

Figures 7, 8:
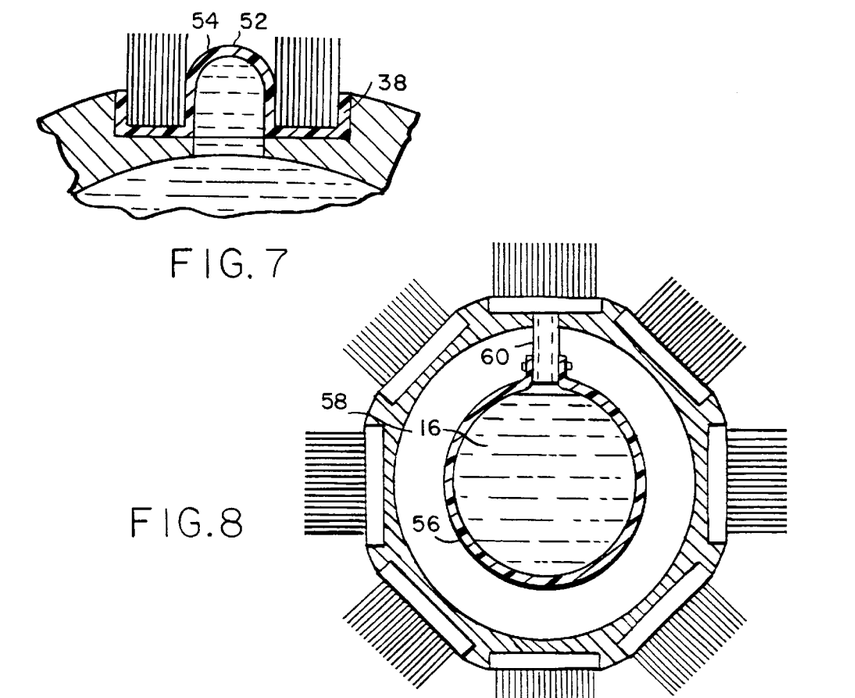
FIG. 7 shows a toothpaste dispensing valve that can be used as an alternate to the valve depicted in FIG. 3.
FIG. 8 shows an arrangement that is a variant of the device shown in FIG. 1.

FIG. 7 shows a toothpaste dispensing valve that can be used as an alternate to the valve depicted in FIG. 3.

The FIG. 7 valve comprises a hollow projection 54 integral with the bristle-mounting elastomer 38. A transverse slit 52 is provided in the end surface of projection 54, so that when the projection 54 is deformed (deflected) by contact with the animal's tooth the slit 52 opens slightly to enable a small quantity of toothpaste to be dispensed from the toothpaste supply.

FIG. 8 shows an arrangement that is a variant of the device shown in FIG. 1.

In the FIG. 8 arrangement the toothpaste 16 is contained within a hollow elastomeric balloon 56; the space surrounding the balloon is pressurized with a compressed gas, e.g., by injecting gas into space 58 via a hypodermic, not shown.

One or more rigid conduits 60 extend between balloon 56 and selected ones of the bristle assemblies. As shown in FIG. 8, there is one conduit 60. However, more than one conduit can be employed. Each conduit 60 has its outer end connected to a dispensing valve, e.g., a valve of the type shown in FIG. 3 or FIG. 7. Those bristle assemblies not connected with conduits are closed (inactive as regards the toothpaste dispensing function).

The device of FIG. 8 is similar to the FIG. 1 device, except that the toothpaste is dispensed from a central space within the balloon, rather than from the space surrounding the balloon.

Figure 9:
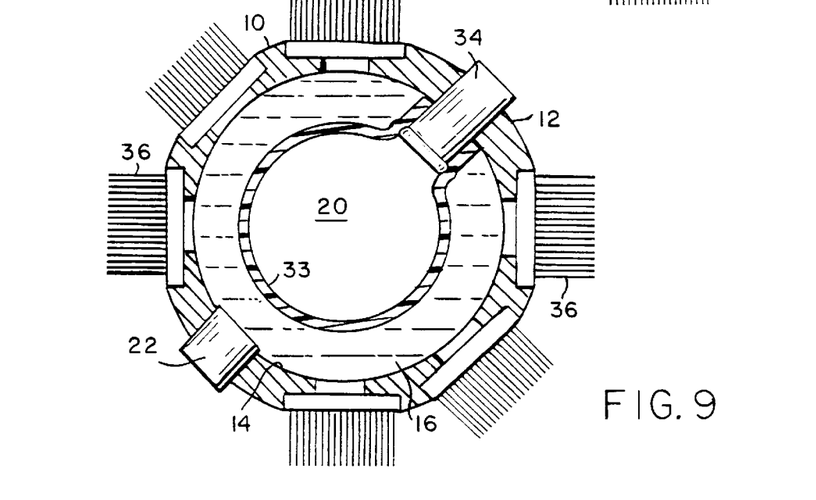
FIG. 9 shows a sectional view, taken in the same direction as FIG. 1, but on a reduced scale, and showing an additional form that the invention can take.

FIG. 9 is a sectional view, taken in the same direction as FIG. 1 but on a reduced scale, and showing an additional form that the invention can take.

FIG. 1 shows the balloon as a spherical elastomeric balloon floatably disposed within the toothpaste, so that the balloon is entirely surrounded by the paste (or gel). FIG. 9 shows an alternate arrangement wherein the balloon 33 has a neck area telescopically fitting on a check valve 34 that may be constructed similarly to the valve shown in FIG. 2.

Valve 34 can, if desired, have a handle with a built-in air pump of operation similar to that used on a blood pressure cuff. The balloon inflation process can be performed before, or after, the toothpaste has been charged into shell 10, via check valve 22.

A least one embodiment of the invention is directed to an animal tooth cleaning device that comprises a three-dimensional shell containing a pressurized supply of toothpaste gel, and a plurality of tooth cleaner bristle units on the shell outer surface. At least some of the bristle units are equipped with metering valves for dispensing toothpaste from the shell into the bristles when a dog or other pet animal exerts a biting action on the shell or bristles.

Another embodiment of the present invention is directed to an animal tooth cleaning device that does not necessarily include an inner supply of toothpaste gel. Instead, such a device has a core element with a plurality of brushes extending therefrom, and a compressible or deformable hollow outer shell disposed around the core element. The core element has a plurality of holes, each of which is aligned with a respective one of the plurality of brushes, so that the brushes, i.e. the bristles, are substantially exposed. When the animal bites against the shell, the shell is compressed, in turn causing the brushes to protrude from the shell and exert a cleaning effect on the animal's teeth. Additionally, each group of brushes may have an area for disposing toothpaste.

In an exemplary, but non-limiting, embodiment, the outer shall may have eight substantially square holes where an inner harder core has fused bristles attached thereto that project through the holes. Of course, it is clear that the number of holes and their shape depends on the geometry and size of the tooth-cleaning device. When the animal exerts a biting action on the device, the bristles are further exposed and the animal's teeth rub on the bristles. This exerts a cleaning effect on the animals teeth. The bristles may be similar to the bristles used on standard human toothbrushes, so that they have minimal propensity for becoming stuck in the animal's tooth spaces.

The length of the bristles and the extent to which they extend from the hollow shell, when it is compressed, depends on the size of the animal. Certainly, the bristles should not be so long as to scratch the gums. Only what is needed to reach the gum-line and remove plaque. In a preferred embodiment, this is in the range of 1/16 to 3/4 of an inch.

Figure 10:
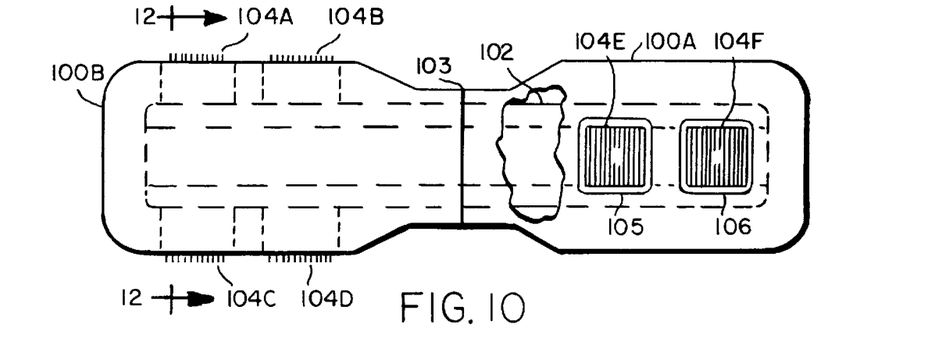
FIG. 10 is an assembly diagram of another embodiment of the invention.

FIG. 10 is an assembly diagram of such an exemplary, but non-limiting, embodiment. As shown in FIG. 10, the device may include a cover and a core 102. In this example, the cover is made from two covers 100A and 100B, which meet at a point 103 when each is assembled over the core 102. The assembling of the cover can include gluing the two covers to one another. The device further includes bristle groups 104A, 104B, 104C, 104D, 104E, and 104F, which in one embodiment are installed in the core 102. Two additional bristle groups, not shown, may be positioned opposite bristle groups 104E and 104F. The core 102 may be made of a firm material, e.g., polypropylene or nylon, and the cover 100 may be made of a less firm material, e.g., a rubber material, so that additional portions of the bristle groups 104 are exposed when an animal depresses, by a biting or chewing action, the softer cover material.

Also shown in FIG. 10 is a space 105 within, for example, the bristle group 104E, and a space 106 within, for example, the bristle group 104F. These spaces 105 and 106 may be used as a receptacle for toothpaste gel. Thus, the toothpaste gel may be inserted in some or all of the spaces, and then the device may be given to the animal. Of course, it is clear that a space could be placed in any bristle group and not necessarily all of them.

Figure 11:
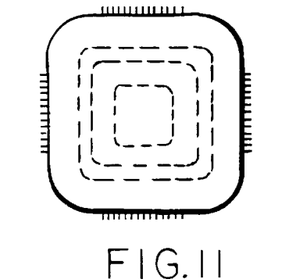
FIG. 11 is an end view of the embodiment of FIG. 10.
Figure 12:
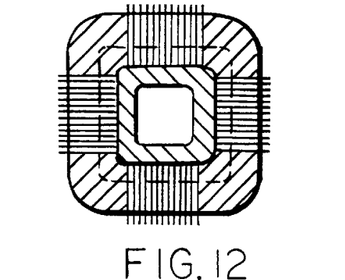
FIG. 12 is a sectional view taken through line A—A of FIG. 10.

FIG. 11 is an end view of the embodiment of FIG. 10 showing protrusion of the bristles prior to depression of the cover by the animal. FIG. 12 is a sectional view taken through line A—A of FIG. 10, and shows how the bristles extend slightly through holes in the cover 100.

Figures 13, 14:
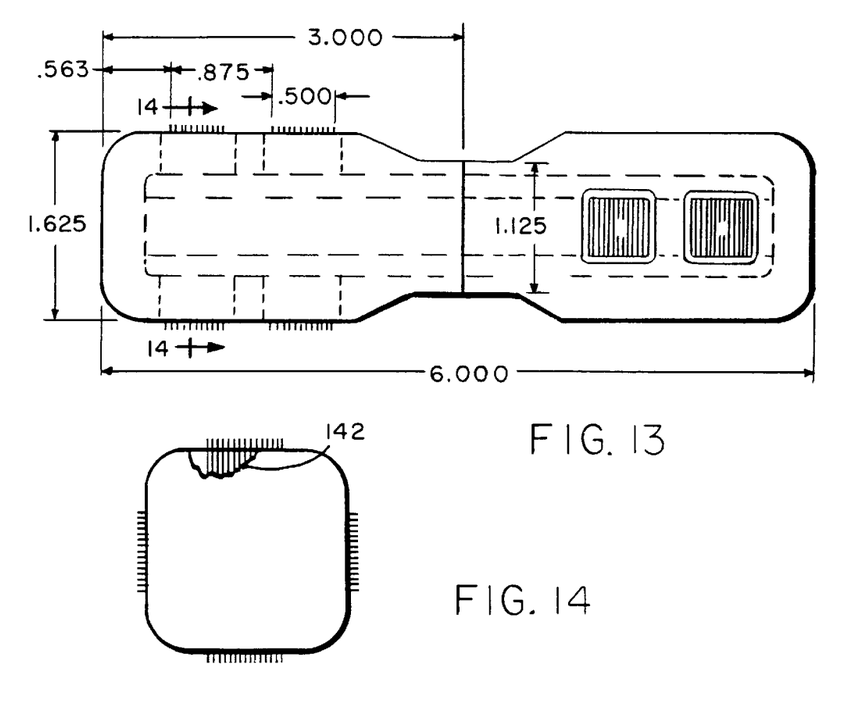
FIG. 13 is an assembly diagram similar to FIG. 10, for which exemplary, non-limiting, measurements are indicated.
FIG. 14 is a diagram of a sectional view of the embodiment of FIG. 10 showing the protrusion of bristles in response to depression of the outer core by an animal tooth.

FIG. 13 is an assembly diagram similar to FIG. 10, for which exemplary, but non-limiting, dimensions are indicated. FIG. 14 is a diagram of a sectional view of the embodiment of FIG. 10 showing the protrusion of bristles in response to depression of the outer core by an animal tooth (not shown). In particular, in this example, the animal's teeth have depressed the region generally shown as 142, so that the bristles in this area extend around the animal's teeth so as to clean the teeth at and under the gum-line.

Figure 15:
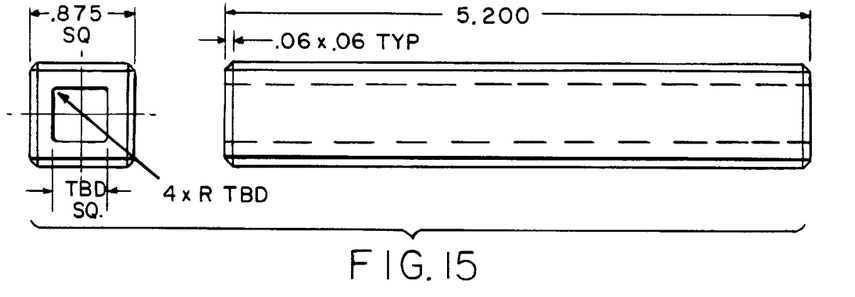
FIG. 15 is a diagram of an exemplary core for the embodiment of FIG. 10.
Figure 16A:
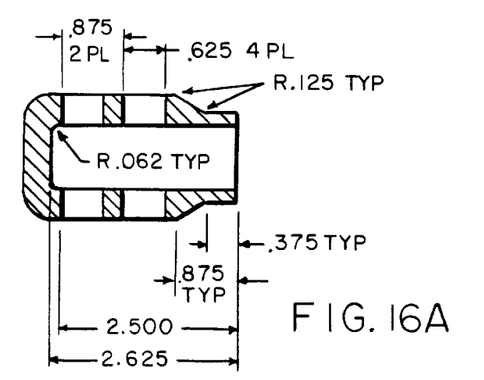
FIGS. 16A, 16B, and 16C show various views of the cover for the embodiment of FIG. 10.
Figure 16B:
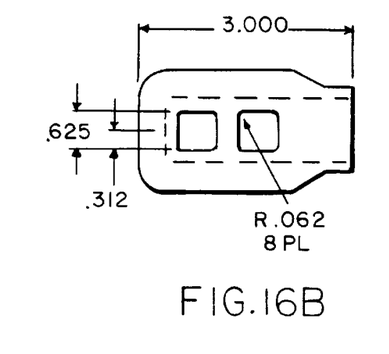
Figure 16C:
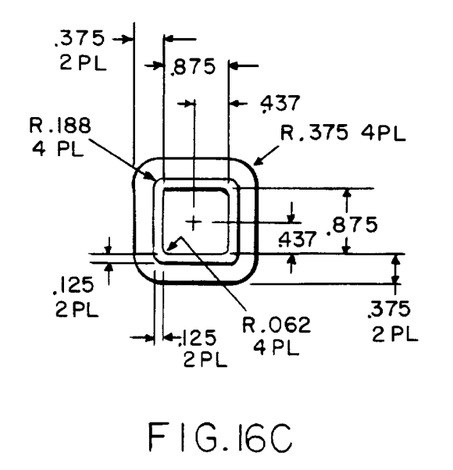

FIG. 15 is a diagram of an exemplary, but non-limiting, core for the embodiment of FIG. 10, and FIGS. 16A, 16B, and 16C show various views of the cover for the non-limiting embodiment of FIG. 10. Of course, none of the dimensions indicated herein are limiting, and are given for exemplary purposes only.

Figure 17:
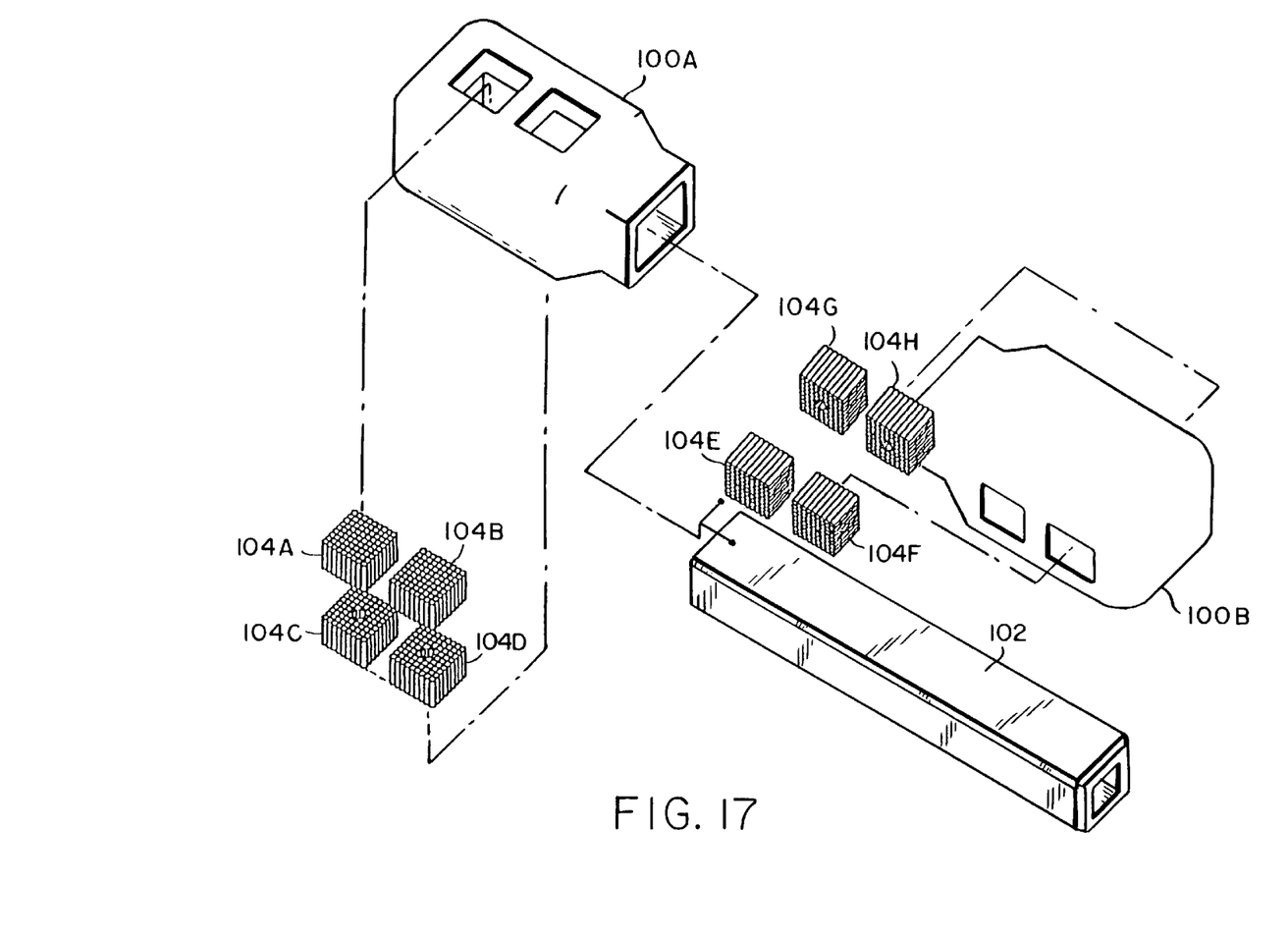
FIG. 17 is an exploded view of the embodiment of FIG. 10.

FIG. 17 is an exploded view of the embodiment of FIG. 10, which also shows the bristle groups 104G and 104H.

It is clear that the materials used for the tooth cleaning device of the present invention must be those that are non-toxic to an animal. Additionally, the material must be of a type that if a small portion were to be broken off by the animal, the portion would pass through the animal's digestive system without causing the animal harm or discomfort. In a preferred embodiment of the present invention, the hollow portion is comprised of a material known as E1470-3 in the SBR family of products as manufactured by Beebe Rubber Division of Chardon Rubber Company, 20 Marshall Street, Nashua, N.H. 03060. Additionally, the core, as already explained, is made from a polypropylene. This is a material similar to that which is used in cutting boards available from restaurant supply outfits.

The core can be constructed as either being solid or hollow. In addition, the cross-section of the core can be either substantially rectangular, circular or have an I-beam form. In order to attract an animal, such as a dog, to the device, the hollow portion can be shaped to look like a dog bone. One of ordinary skill in the art can see that the hollow outer shell can take on any one of numerous shapes so as to attract the interest of a pet.

Further, it is clear that any one of a number of attractants can be placed in the device. These include, but are not limited to, catnip and beef flavor.

The preferred embodiment of the present invention includes fusing the bristles of the brushes to the core. An example of this bristle fusion technology is available from Tucel Industries, Inc., Forrestdale, Vt. Alternatively, the brush bristles could be assembled onto a metal plate that is then stapled to the core. As another alternative, an epoxy can be used to attach the brush bristles to the core. The use of epoxy, however, is problematic since most epoxy is toxic and would not be recommended for a device to go into a pet's mouth.

Having thus described at least one illustrative embodiment of the invention, various alterations, modifications and improvements will readily occur to those skilled in the art. Such alterations, modifications and improvements are intended to be within the spirit and scope of the invention.

Accordingly, the foregoing description is by way of example only and is not intended as limiting. The invention is limited only as defined in the following claims and the equivalents thereto.

What is claimed is:

1. An animal tooth cleaning device, comprising:

a core element having at least one brush extending in a first direction therefrom; and an outer shell disposed around the core element, the outer shell including at least one opening;

wherein the at least one opening is aligned with a respective one of the at least one brushes, and wherein the outer shell comprises means for deforming in a direction parallel to the first direction of the at least one brush when an animal bites the device, in turn causing the at least one brush to protrude through its respective opening so as to contact the animal's teeth.

2. The animal tooth cleaning device of claim 1, wherein the at least one brush includes an area without bristles, said area provided to receive toothpaste.

3. The animal tooth cleaning device of claim 1, wherein the outer shell has a bone-type configuration.

4. The device of claim 1, wherein the core element comprises polypropylene.

5. The device of claim 1, wherein first and second brushes extend from the core element in opposite directions from one another.

6. The device of claim 1, wherein each brush of the at least one brushes comprises a plurality of bristles; and wherein the bristles are fused to the core element.

7. The device of claim 1, wherein the core element has a substantially rectangular cross-section.

8. The device of claim 1, wherein the outer shell comprises first and second half-shell components.

9. The device of claim 8, wherein the first and second half-shell components are attached to another by an adhesive to form the outer shell.

10. The device of claim 1, wherein a second brush extends from the core element in a second direction different from the first direction.

11. The device of claim 10, wherein an angle between the first and second directions is approximately 90°.

12. A method of manufacturing a device for cleaning an animal's teeth, the method comprising:

providing a core element;

providing at least one brush on a surface of the core element, the at least one brush extending from the core element in a first direction;

disposing a deformable outer shell around the core element, the shell having at least one opening aligned with the at least one brush, and providing the outer shell with means for deforming in a direction parallel to the first direction of the at least one brush when an animal bites the device, in turn causing the at least one brush to protrude through its respective opening so as to contact the animal's teeth.

13. The method as recited in claim 12, wherein the core element comprises polypropylene.

14. The method as recited in claim 13, wherein the outer shell comprises rubber.

15. The method as recited in claim 12, wherein the at least one brush comprises a plurality of bristles, and wherein the step of providing the at least one brush comprises fusing the plurality of bristles to the core element.

16. A method of cleaning the teeth of an animal, the method comprising:

providing at least one brush on a surface of a core element so that the at least one brush extends radially therefrom;

disposing a hollow outer shell about the core element, the hollow outer shell comprising at least one opening aligned with a respective at least one brush; and causing the animal to bite on the hollow outer shell, thereby causing the shell to deform and expose the at least one brush, through the respective opening, wherein the at least one brush contacts at least one tooth of the animal.

17. The method of claim 16, wherein the at least one brush includes an area without bristles, the method further comprising providing a toothpaste in said area.

18. The method of claim 16, further comprising:

providing a first brush to extend from the core element in a first direction and a second brush to extend from the core element in a second direction different from the first direction.

\* \* \* \* \*